United States Patent Office 3,000,892
Patented Sept. 19, 1961

3,000,892
1-AROYLALKYL-4-AROYLPIPERAZINES
Paul A. J. Janssen, Antwerpse Steenweg 16, Vosselaar, near Turnhout, Belgium
No Drawing. Filed Nov. 16, 1959, Ser. No. 852,956
5 Claims. (Cl. 260—268)

This invention relates to a new group of arolylpiperazine derivatives and more particularly to 1-aroylalkyl-4-aroylpiperazine of the general structural formula

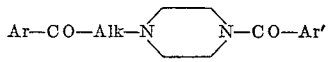

and the pharmaceutically useful non-toxic salts thereof wherein Alk is a lower alkylene radical containing at least 3 carbon atoms; Ar is a member of the class consisting of phenyl, methoxyphenyl, and halophenyl; and Ar' is a member of the class consisting of phenyl, methoxyphenyl, halophenyl, dimethoxyphenyl, and trimethoxyphenyl.

The radical Alk is a bivalent saturated hydrocarbon radical such as butylene, trimethylene, tetramethylene, pentamethylene and hexamethylene.

The organic bases of this invention form pharmaceutically acceptable salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds of this invention can be prepared by the condensation of a compound of the structural formula

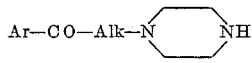

with a compound of the formula

Halogen—CO—Ar' wherein Alk, Ar, and Ar' are defined as above. The reaction can be carried out in an inert solvent such as an aromatic hydrocarbon (e.g. benzene, toluene, xylene); a lower alkanol (e.g. ethanol, butanol, propanol); or a lower alkanone (e.g. acetone, butanone, or hexanone). In certain cases the reaction may be usefully accelerated by elevated temperatures.

The aroylalkylpiperazine intermediates used in the above procedure can be conveniently prepared by the condensation of a compound of the formula Ar—CO—Alk—halogen with piperazine.

The aroylalkyl halides used as intermediates can be prepared conveniently by the Friedel-Crafts reaction including its mild variations employing, for example, γ-chlorobutyryl chloride in benzene or an appropriately substituted benzene. These intermediates can also be prepared by the reaction of an ω-haloalkylnitrile with an appropriate aryl magnesium bromide followed by an acid hydrolysis of the adduct.

The compounds of this invention can also be prepared by the condensation of a compound of the formula Ar—CO—Alk—halogen with a compound of the formula

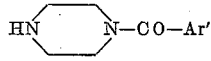

The compounds of this invention have useful pharmacological properties. They are potent depressants of the central nervous system. Specifically they possess hypnotic activity. They are also barbiturate potentiators and analgesics.

The compounds which constitute this invention and their methods for preparation will appear more fully from a consideration of the following examples which are given for the purpose of illustration only and are not to be construed as limiting the invention in spirit or in scope. In these examples quantities are indicated in parts by weight; temperatures are given in degrees centigrade (°C.) and pressures in millimeters of mercury (mm.).

Example 1

To an agitated boiling solution of 69 parts of piperazine in 160 parts of toluene is added in the course of 1 hour 36.4 parts of γ-chlorobutyrophenone in 40 parts of anhydrous toluene. The agitating and refluxing of the mixture is continued for 2 hours. The mixture is cooled, and filtered. The filtrate is evaporated. The residue is fractionated under vacuum to yield 1-(γ-benzoylpropyl)-piperazine boiling at about 179.5–180° C. at 2 mm. pressure.

To a solution of 7 parts of 1-(γ-benzoylpropyl)piperazine and 60 parts of benzene and 50 parts of a 10% aqueous sodium hydroxide solution is added 4.5 parts of benzoyl chloride with stirring. The mixture is heated slowly to about 70° C. for 45–60 minutes, cooled, and the layers are separated. The water layer is extracted twice with benzene. The combined organic solutions are washed with water and dried over sodium carbonate. After evaporation of the solvent, the residue is crystallized twice from diisopropyl ether by chilling to yield 1-(γ-benzoylpropyl)-4-benzoylpiperazine melting at about 85–86° C.

By substituting ω-chlorocaprophenone for γ-chlorobutyrophenone in the above procedure, 1-(ω-benzoylpentyl)-4-benzoylpiperazine is obtained. The compound has the structural formula

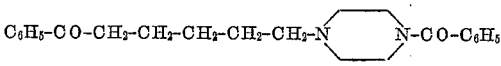

Example 2

By substituting 4-fluorobenzoyl chloride in the procedure of Example 1, 1-(γ-benzoylpropyl)-4-(4-fluorobenzoyl)piperazine is obtained. Hydrogen chloride gas is passed through an ethereal solution of the base. The precipitate is collected on a filter and dried to yield the yellow powder of the hydrochloride melting at about 214.5–216.5° C.

Example 3

By substituting 2-chlorobenzoyl chloride in the procedure of Example 1, 1-(γ-benzoylpropyl)-4-(2-chlorobenzoyl)piperazine is obtained as an oily precipitate. This oil is dissolved in ether. Hydrogen chloride gas is passed through the solution and the precipitate which forms is collected on a filter and dried to yield the pale yellow powder of 1-(γ-benzoylpropyl)-4-(2-chlorobenzoyl)piperazine melting at about 216–217.5° C.

Example 4

By substituting 3-chlorobenzoyl chloride in the procedure of Example 1, 1-(γ-benzoylpropyl)-4-(3-chlorobenzoyl)piperazine is obtained. The base is dissolved in 16 parts of benzene and 400 parts of dry ether. Hydrogen chloride gas is passed through the solution to form a precipitate which is collected on a filter and dried to yield the white powder of the hydrochloride melting at about 210.5–212.5° C.

Example 5

By substituting 4-chlorobenzoyl chloride in the procedure of Example 1, 1-(γ-benzoylpropyl)-4-(4-chlorobenzoyl)piperazine is obtained. The compound melts at about 98–99° C.

Example 6

A solution of 6.7 parts of 3-trifluoromethylbenzoyl chloride in 20 parts of benzene is added with stirring to a solution of 7 parts of 1-(γ-benzoylpropyl)piperazine, 55 parts of a 10% sodium hydroxide solution, and 40 parts benzene. The mixture is then heated slowly to about 70° C. and the stirring is continued. After cooling, the aqueous layer is separated and extracted with benzene. The benzene extract and the benzene layers are combined, washed with water, dried over sodium sulfate, and evaporated. The residue is dissolved in ether and chilled at −20° C. to yield a solid precipitate which is collected on a filter and dried to yield 1-(γ-benzoylpropyl)-4-(3-trifluoromethylbenzoyl)piperazine melting at about 77.5–79° C. The compound has the structural formula

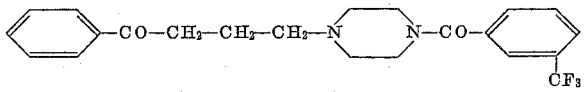

Example 7

By substituting 2-methoxybenzoyl chloride in the procedure of Example 1, 1-(γ-benzoylpropyl)-4-(2-methoxybenzoyl)piperazine is obtained. Hydrogen chloride gas is passed through an ethereal solution of the base. The precipitate is collected on a filter and dried to yield the white amorphous powder of the hydrochloride melting at about 140.8–143° C.

Example 8

By substituting 2,6-dimethoxybenzoyl chloride in the procedure of Example 1, a residue containing 1-(γ-benzoylpropyl)-4-(2,6-dimethoxybenzoyl)piperazine is obtained. This residue is dissolved in benzene. The solution is filtered and the filtrate is diluted with ether. Hydrogen chloride gas is passed through the solution to form a precipitate which is collected and treated so that the crude free base is liberated again. The crude material containing the base is extracted with benzene. The benzene solution is dried over sodium sulfate and evaporated. The residue is dissolved in ethanol. An excess of oxalic acid in ethanol is added to this solution. The mixture is allowed to stand for 2 hours at room temperature and the solid which precipitates is collected on a filter and dried to yield 1-(γ-benzoylpropyl)-4-(2,6-dimethoxybenzoyl)piperazine oxalate melting at about 193.1–194.8° C.

Example 9

By substituting 6.3 parts of 3,4,5-trimethoxybenzoyl chloride in the procedure of Example 8, the oxalate of 1-(γ-benzoylpropyl)-4-(3,4,5-trimethoxybenzoyl)piperazine is obtained. The compound melts at about 187.4–188.2° C.

Example 10

To a boiling solution of 301.5 parts of piperazine in 500 parts of toluene is added portionwise a solution of 103 parts of γ-chloro-4-fluorobutyrophenone in 100 parts of toluene. After boiling and stirring for 2 hours, the mixture is cooled and filtered. The filtrate is chilled at −20° C. overnight and then filtered again to remove impurities. After evaporation, the residue is dissolved in ether. The ethereal solution is chilled at −20° C. and filtered again. Dry hydrogen chloride gas is passed through the filtrate. The solid precipitate is collected on a filter and recrystallized from acetone to yield 1-[γ-(4-fluorobenzoyl)propyl]piperazine hydrochloride melting at about 156–159.5° C. The compound is liberated by dissolving the salt in water, rendering the solution alkaline, extracting the solution with ether, and evaporating the ether extract to yield the base as a residue.

To a stirred solution of 8.6 parts of 1-[γ-(4-fluorobenzoyl)propyl]piperazine in 40 parts of benzene and 67 parts of 10% sodium hydroxide are added 4.5 parts of benzoyl chloride in 20 parts of benzene. After heating for about 1 hour the mixture is cooled and the layers are separated. The aqueous layer is extracted with benzene. The extract and the organic layer are combined, washed with water, dried, and evaporated. The residue is crystallized from diisopropyl ether by chilling to yield the crude base which is then dissolved in ether. Hydrogen chloride gas is passed through the ethereal solution to precipitate the hydrochloride of 1-[γ-(4-fluorobenzoyl)propyl]-4-benzoylpiperazine which, after drying, melts at about 228–232.5° C.

By substituting 120 parts of γ-chloro-3-iodobutyrophenone for γ-chloro-4-fluorobutyrophenone in the first paragraph of this example, 1-[γ-(3-iodobenzoyl)propyl]piperazine is obtained. This compound is then treated by the procedure of the above paragraph to give 1-[γ-(4-iodobenzoyl)propyl]-4-benzoylpiperazine hydrochloride of the formula

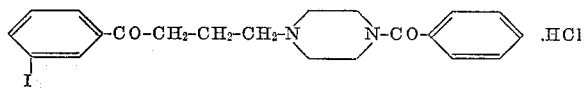

Example 11

To a boiling solution of 21.3 parts of γ-chloro-4-methoxybutyrophenone and 100 parts of toluene is added with stirring 60.3 parts of piperazine in 20 parts of toluene. After the stirring and boiling is continued for 2 hours, the mixture is cooled and filtered. The layers are separated and the organic layer is evaporated. The residue is dissolved in ether and chilled at −20° C. The solid which precipitates is collected on a filter, dissolved in ether, decolorized with activated charcoal, and then evaporated to yield the crude 1-[γ-(4-methoxybenzoyl)propyl]piperazine. This compound is pure enough to use in the following procedure.

By an equimolar substituting of 1-[γ-(4-methoxybenzoyl)propyl]piperazine in the procedure of Example 1 and crystallization from ether, 1-[γ-(4-methoxybenzoyl)propyl]-4-benzoylpiperazine is obtained. Hydrogen chloride gas is passed through an ethereal solution of the base. The precipitate is collected on a filter and dried to yield the hydrochloride melting at about 200.2–203.2° C.

Example 12

By equimolar substitution of 1-[γ-(4-methoxybenzoyl)propyl]piperazine and 4-fluorobenzoyl chloride in the procedure of Example 1 and crystallization from ether by chilling at −20° C., decolorizing with activated charcoal, and evaporating the solution to about ⅓ of its volume, 1-[γ-(4-methoxybenzoyl)propyl]-4-(4-fluorobenzoyl)piperazine melting at about 65.2–66.2° C. is obtained.

Example 13

By equimolar substituting of 1-[γ-(4-methoxybenzoyl)propyl]piperazine and 2-methoxybenzoyl chloride in the procedure of Example 1 and crystallization from ether by chilling at −20° C., the white amorphous powder of 1-[γ-(4-methoxybenzoyl)propyl]-4-(2-methoxybenzoyl)piperazine melting at about 97–98.2° C. is obtained.

Example 14

To a solution of 7.9 parts of 1-[γ-(4-methoxybenzoyl)propyl]piperazine, 40 parts of benzene, and 55 parts of a 10% aqueous sodium hydroxide solution is added 7.15 parts of 2,6-dimethoxybenzoyl chloride in 20 parts of benzene portionwise. The mixture is then heated at 70° C. for about an hour. After cooling, the layers are separated. The water layer is extracted with benzene.

formed is then substituted in the first paragraph of this example. The compound has the structural formula

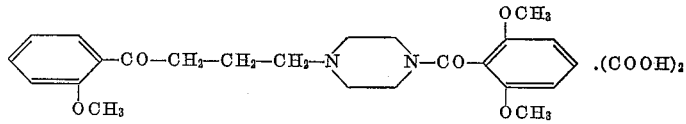

The combined benzene solutions are then washed with water, dried over sodium carbonate, decolorized with activated charcoal, and evaporated. The oily residue is dissolved in benzene, dried over sodium carbonate, and evaporated. This residue is then dissolved in an excess of oxalic acid in ethanol. After standing for 1 hour at room temperature, the precipitate is collected on a filter and then recrystallized from ethanol to yield the white amorphous powder of 1-[γ-(4-methoxybenzoyl)propyl]-4-(2,6-dimethoxybenzoyl)piperazine oxalate melting at about 201.5–201.8° C.

The oxalate of 1-[γ-(2-methoxybenzoyl)propyl]-4-(2,6-dimethoxybenzoyl)piperazine is prepared by substituting γ-chloro-2-methoxybutyrophenone for γ-chloro-4-methoxybutyrophenone in the first paragraph of Example 12. The 1-[γ-(2-methoxybenzoyl)propyl]piperazine thus

What is claimed is:
1. A compound of the structural formula

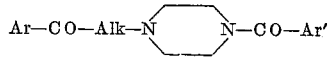

wherein Alk is a lower alkylene radical, Ar is a member of the class consisting of phenyl, halophenyl, and methoxyphenyl, and Ar' is a member of the class consisting of phenyl, halophenyl, methoxyphenyl, dimethoxyphenyl, and trimethoxyphenyl.

2. A compound of the structural formula

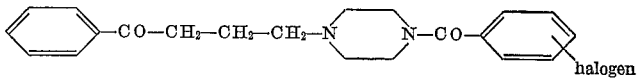

3. 1-(γ-benzoylpropyl)-4-(2-chlorobenzoyl)piperazine hydrochloride.
4. 1-(γ-benzoylpropyl)-4-(2-chlorobenzoyl)piperazine.
5. A compound of the structural formula

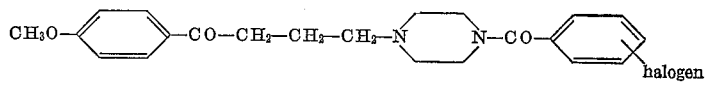

References Cited in the file of this patent
FOREIGN PATENTS
789,704    Great Britain ---------- Jan. 29, 1958
OTHER REFERENCES
Pollard et al.: Jour. Amer. Chem. Soc., vol. 76, pages 1853–1855 (1954).